2,927,355

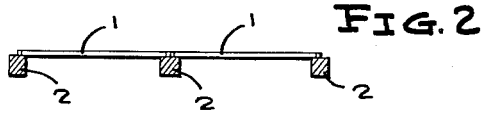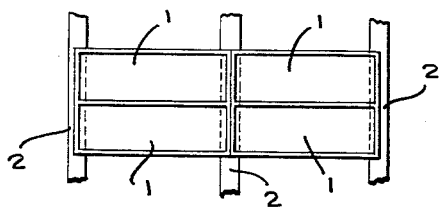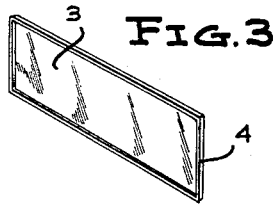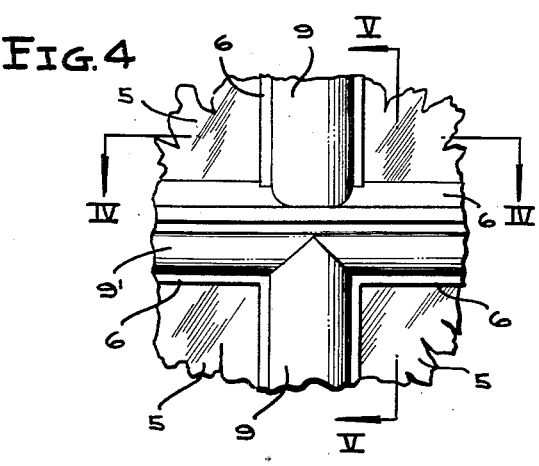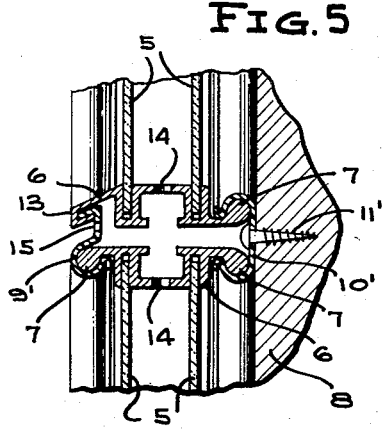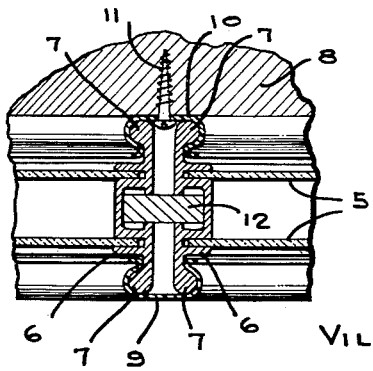
INVENTOR.
VILLUM BENEDIKT KANN RASMUSSEN United States Patent Office 2,927,355
Patented Mar. 8, 1960

GLASS FACE CONSISTING OF FRAMED UNITS COMPRISING ONE OR MORE LAYERS OF GLASS

Villum Benedikt Kann Rasmussen, Gentofte, Denmark, assignor to V. Kann Rasmussen & Co., Copenhagen, Denmark, a firm Application September 19, 1956, Serial No. 610,836

Claims priority, application Denmark September 22, 1955

4 Claims. (Cl. 20—40)

This invention relates to a glass face consisting of framed units comprising one or more layers of glass. Such glass face may by way of example be a glass roof, a glass front, or a glass partition.

Hitherto, glass roofs have usually been built in the manner that comparatively large glass panes, often with wire cloth reinforcement, are mounted on special window bars and movably secured thereto by means of resilient straps or similar mountings. The mobility between the bars and the glass panes is of very essential importance with a view to avoiding the cracking of the panes when, e.g. on account of temperature variations, the panes or the support including the bars work. Glass fronts and glass partitions may be erected in almost the same manner but may also be bricked up of glass blocks or glass bricks.

Especially for obtaining a sufficient degree of weather tightness and also for the reduction of the required number of bars, the panes of a glass roof of the type described above have to be rather large, e.g. 50–75 cm. wide and 125–150 high. Hence follows that also the thickness of the glass panes has to be relatively great, e.g. 6–7 mm., and these large glass dimensions involve correspondingly heavy initial costs per unit of area of the glass face. Also the mounting of the glass panes will be rather expensive owing to the difficulties in handling the large and heavy panes.

The invention has for its primary object to bring about a substantial reduction in prices of glass faces as defined above, and with this in view the principal feature of invention is that the frames of the several units are clamped together with a certain degree of mobility between the individual frames. In this construction, the individual glass units may have the size being most advantageous as regard prices, since a greater or smaller number of framed units may be assembled to form a field of suitable size prior to or during the mounting on the support. The reduction in size of the individual units afforded by the present invention further opens the possibility of reducing the glass thickness, so that not only a substantial economy in the glass price but also a considerable reduction in the glass weight per unit of area are attained, and as the frames need not contribute essentially to the total weight, since they may, for example, consist of aluminum, it lies also within the possibilities of the invention to use a lighter and, consequently, cheaper support than in case of a known glass face serving the same purpose. It is an important characteristic of the glass face according to the invention that the movably interjoined frame members of two adjacent units so to speak replace the conventionally used bars in the support of the glass face. The construction of the said support is hereby substantially simplified since, even in case of a glass roof of considerable height, the support need only consist of a suitable number of purlins or rafters, e.g. one rafter for each vertical row of units in the roof, and need not comprise bars between the rafters.

According to the invention, the frames may expediently be assembled by means of resilient mounting members. These mounting members will permit of the desired mobility between the frames so that the glass face may work without the individual units being cracked, and the mounting members may easily be so designed that the assembling of the units and the mounting thereof on the support may be effected quickly and safely even if this work is made by workers without particular skill.

The resilient mounting members may advantageously consist of straps or channel-shaped rails which solely by their inherent resiliency are clamped to and connect together bead-like or channel-shaped portions of the frames, at least some of said straps or rails being secured to the support of the glass face. When such mounting members are used, the frames need not have screw holes or the like weakenings, but the most essential feature is, however, that mounting members of this type facilitate the mounting work to the widest extent.

Between the assembled frames and, if so desired, also between said frames and the support of the glass face, resilient or adjustable spacers may be interposed. The main object of these spacers is to compensate for inaccuracies, if any, in the overall measures of the frames or in the pane size.

When each unit comprises two or more layers of glass it may, as is well known, be necessary or at any rate desirable to prevent dew fall in the glass space. To this end care may have been taken to secure the greatest possible tightness between the frame and the glass so that the space is almost hermetically sealed. The dew fall may, however, also be counter-acted by the venting of the space between the glass layers, and the invention makes it possible to effect such venting or ventilation in a particularly simple fashion. Thus, according to the invention, the space or spaces between the glass layers in a unit may through one or more holes in the frame be in open communication with a duct system open to the atmosphere and formed between the joined frames. Thus, the said duct system is formed by the frames proper during the mounting of the glass face and, consequently, the provision of the ducts need not incur increased expenses. Further, a very effective ventilation may be ensured because the ducts may extend vertically and/or horizontally across the entire glass face.

The invention is more fully explained in the following with reference to the accompanying drawing, in which Fig. 1 shows part of an embodiment of a glass roof according to the invention, viewed from the outside, Fig. 2 the roof portion shown in Fig. 1, viewed from the edge, Fig. 3 a perspective view of a single unit consisting of one or more panes in a surrounding frame, Fig. 4 a small section of Fig. 1 on a larger scale, Fig. 5 a cross section on line V—V in Fig. 4, and Fig. 6 a cross-section on line VI—VI in Fig. 4.

The roof portion shown in Figs. 1 and 2 consists of four units 1, clamped resiliently to each other and to a support which may consist of a number of rafters or purlins 2. The resilient clamping may be provided by means of resilient straps or rails as will be more fully explained in the following.

As shown in Fig. 3, each unit consists of a rectangular glass pane 3 embraced by a frame 4 which, for example, may consist of aluminium. In Figs. 1, 2, and 3, each unit is assumed to have only one layer of glass.

The embodiment illustrated in Figs. 4, 5, and 6 comprises units having two layers of glass 5 mounted in a common frame 6 of aluminum, extruded plastic or other material suitable for the purpose. Fig. 6 shows the adjacent side members of two frames 6 provided with bead-like portions 7 at both sides, i.e. both at the free side of the glass and at the side facing the support 8. The two beads 7 at the free side of the glass face are clamped together by a resilient mounting member in the form of a channel-shaped rail 9 permitting a certain degree of mobility between the frames 6. The two beads 7 at the other side of the glass face are clamped together in a corresponding manner by means of a resilient channel-shaped rail 10 which is secured to the support 8 by means of screws 11. In the space between the two frames 6 there is shown, purely diagrammatically, spacer or distance holder 12 which may be resilient or adjustable and serves to adjust the size of the space between the frames.

Also the horizontal frame side members, see Fig. 5, are on their backs provided with beads 7 clamped together by means of resilient straps or a channel-shaped rail 10' with holding screws 11'. At the other or free side of the glass face, the upper side member of the lower frame 6 is provided with a similar bead 7 whereas the lower side member of the upper frame is provided with a channel-shaped portion 13 forming a drip nose for water, e.g. rain water which might run down the outer glass layer 5. The uppermost edge of the mounting rail 9' provided at this place is inserted into the channel-shaped portion 13 while the lowermost edge of the rail grips round the bead 7.

The mounting of a glass face as the one shown in Figs. 4, 5, and 6 is effected in the manner that the two rails 10 and 10' to be carried by the support 8 are first secured to said support. This done, the units may either one by one or assembled into larger fields immediately be mounted into the fixed mounting rails and then be further secured by the rails 9 and 9' being placed at the opposite side of the glass face.

As most clearly appears from Figs. 5 and 6, the central portions of the frame pieces 6 form a duct system in the glass face. As described above, this duct system may be used for venting or ventilating the space between the two layers of glass 5 of each unit, because said space may communicate with the duct system through openings 14, Fig. 5, in the webs of the frame members. At suitable points this duct system is open towards the atmosphere, e.g. through holes 15, Fig. 5, in the rail 9'. If so desired, filters may be provided in the duct system for the purpose of purifying the ventilation air before it flows into the space between the panes, and likewise care may be taken to dehumidify the ventilation air e.g. by means of humidity absorbers provided in the path of flow of the air.

In the above description and in the following claims only units of glass have been mentioned but it will be understood that similar units of other material may also be considered, e.g. units of transparent or opaque plastic.

I claim:

1. A structure comprising a plurality of sections lying in one plane, each of said sections consisting of a polygonal frame and at least one pane supported thereby and immovable relative thereto, resilient connecting elements engaging coextensive and spaced sides of adjacent frames to one another to form non-rigid bipartite mullions of the structure, each of said sides of adjacent frames having bead-like portions extending perpendicular relative to the plane of the pane supported thereby, said resilient connecting elements positively engaging said bead-like portions of adjacent frames to form with said sides the non-rigid structure, resilient spacer means interposed between said coextensive and spaced sides to provide space for relative coplanar movement between adjacent frames.

2. A window frame assembly comprising a plurality of coplonar and spaced apart framed units, resilient means between said adjacent frame units to permit relative coplanar movement therebetween, each of said frame members having integral bead-like portions in a plane perpendicular to the plane of the unit in an adjacent relationship to each other, resilient clamping means connecting adjacent bead-like portions to form the unitary frame assembly permitting relative coplanar movement between adjacent frame units.

3. A structure comprising a plurality of sections lying in one plane, each of said sections consisting of a polygonal frame and at least one pane supported thereby and immovable relative thereto, resilient means between adjacent frames to allow relative motion toward and away from each other, channel-shaped portions integral with the edge of the frame of each of said sections, resilient mounting means have channel-shaped rails operatively connecting together adjacent channel-shaped portions to form a unitary structure with relative movement between adjacent sections.

4. A window assembly comprising a plurality of integral frame structures lying in one plane, each frame structure having at least one pane supported rigidly therein, each frame structure having a channel-shaped edge integral therewith with adjacent frame structures having their respective channel-shaped edges in a spaced side-by-side postiion, a flexible load carrying member positively connecting adjacent channel-shaped edges to support the assembly in a non-rigid unitary structure, and a resilient member supported between adjacent frame structures to permit relative movement therebetween.

References Cited in the file of this patent

UNITED STATES PATENTS

| | | |
|---|---|---|
| 1,848,673 | Spink | Mar. 8, 1932 |
| 1,959,766 | Saylor | May 22, 1934 |
| 2,097,988 | Ross et al. | Nov. 2, 1937 |
| 2,164,815 | Hadjinsky | July 4, 1939 |
| 2,203,174 | Muttray et al. | June 4, 1940 |
| 2,604,195 | Peremi et al. | July 22, 1952 |
| 2,762,474 | Sylvan | Sept. 11, 1956 |

FOREIGN PATENTS

| | | |
|---|---|---|
| 958,990 | France | Sept. 21, 1949 |